United States Patent [19]
Dundas et al.

[11] Patent Number: 5,749,275
[45] Date of Patent: May 12, 1998

[54] APPARATUS FOR TRIMMING THE NECK OF BLOW MOLDED PLASTIC BOTTLES AND METHOD

[75] Inventors: Dennis L. Dundas, Dover; Paul W. Klinedinst, Windsor, both of Pa.

[73] Assignee: Graham Engineering Corporation, York, Pa.

[21] Appl. No.: 528,347

[22] Filed: Sep. 14, 1995

[51] Int. Cl.$^6$ ................ B26D 7/02; B26D 5/08
[52] U.S. Cl. ................ 83/24; 83/681; 83/914; 264/536; 425/527; 425/806
[58] Field of Search ............. 83/946, 914, 681, 83/682, 100, 111, 54, 24; 264/536; 425/806, 527

[56] References Cited

U.S. PATENT DOCUMENTS

| | | | |
|---|---|---|---|
| 638,711 | 12/1899 | Higgind | 83/188 |
| 1,582,052 | 4/1926 | Klages | 83/49 |
| 1,941,316 | 12/1933 | Patzer | 83/578 |
| 2,060,888 | 4/1936 | Newman | 83/660 |
| 2,670,795 | 3/1954 | Griep | 83/185 |
| 2,818,924 | 1/1958 | Lang | 83/685 |
| 2,890,483 | 6/1959 | Soubier | 225/102 X |
| 2,988,776 | 6/1961 | Schaich | 83/563 X |
| 3,009,198 | 11/1961 | Kalman et al. | 425/296 |
| 3,025,562 | 3/1962 | Nelson | 425/531 |
| 3,032,809 | 5/1962 | Willard | 264/533 |
| 3,120,143 | 2/1964 | Kreider | 83/454 |
| 3,127,636 | 4/1964 | Heider | 264/533 |
| 3,145,243 | 8/1964 | Hagen | 264/536 |
| 3,164,646 | 1/1965 | Fischer | 264/526 |
| 3,209,401 | 10/1965 | Mehnert | 425/525 |
| 3,224,038 | 12/1965 | Budesheim | 425/531 |
| 3,268,641 | 8/1966 | King | 264/531 |
| 3,272,896 | 9/1966 | Winchester, Jr. | 264/533 |
| 3,278,665 | 10/1966 | Harrison | 264/529 |
| 3,295,347 | 1/1967 | Fuessle et al. | 72/55 |
| 3,314,106 | 4/1967 | Latrielle et al. | 425/525 |
| 3,340,569 | 9/1967 | Hagen | 425/532 |
| 3,351,981 | 11/1967 | Rupert | 425/292 |
| 3,363,282 | 1/1968 | Hagen et al. | 425/216 |
| 3,369,272 | 2/1968 | Martin, Jr. et al. | 425/525 |
| 3,391,588 | 7/1968 | Brown | 83/24 |
| 3,404,594 | 10/1968 | Dollenmayer | 83/587 |
| 3,411,387 | 11/1968 | Bailey | 83/30 |
| 3,417,428 | 12/1968 | Rupert | 425/527 |
| 3,429,211 | 2/1969 | Pelot | 82/46 |
| 3,454,690 | 7/1969 | Anderson et al. | 264/98 |
| 3,464,084 | 9/1969 | Thompson | 225/100 X |
| 3,465,931 | 9/1969 | Rupert | 225/1 |
| 3,469,076 | 9/1969 | Saslawsky | 219/383 |
| 3,470,582 | 10/1969 | Martin, Jr. | 425/525 |
| 3,487,501 | 1/1970 | Siard et al. | 425/527 |
| 3,494,520 | 2/1970 | Bewalda, Jr. et al. | 225/94 |
| 3,507,429 | 4/1970 | Cunningham et al. | 225/100 X |
| 3,540,371 | 11/1970 | Rome et al. | 101/38 |
| 3,562,372 | 2/1971 | Schjeldahl et al. | 264/94 |
| 3,584,338 | 6/1971 | Fischer et al. | 425/190 |
| 3,597,793 | 8/1971 | Weiler et al. | 18/5 |
| 3,608,021 | 9/1971 | Ziegler | 264/98 |
| 3,657,406 | 4/1972 | Delebarre | 264/98 |
| 3,736,091 | 5/1973 | Reilly | 425/326 |
| 3,737,273 | 6/1973 | Conner | 426/326 |
| 3,762,263 | 10/1973 | Bocceda | 83/660 |
| 3,769,394 | 10/1973 | Latrielle | 264/98 |
| 3,772,946 | 11/1973 | Sarra | 83/914 X |
| 3,783,724 | 1/1974 | Uhlig | 83/140 |
| 3,791,245 | 2/1974 | Eggert | 83/370 |
| 3,796,531 | 3/1974 | Bowers | 425/387 |

(List continued on next page.)

*Primary Examiner*—Douglas D. Watts
*Assistant Examiner*—Elizabeth Stanley
*Attorney, Agent, or Firm*—Thomas Hooker, P.C.

[57] ABSTRACT

An apparatus and method for trimming an inner ring from the neck flange of a blow-molded plastic bottle by extending a reverse punch having a lead end and a trailing end larger than the lead end into the bottle through the flange opening, elastically bending the flange into the interior of the bottle as the punch passes and withdrawing the reverse punch from the bottle and trimming a ring from the flange.

31 Claims, 5 Drawing Sheets

U.S. PATENT DOCUMENTS

| | | | |
|---|---|---|---|
| 3,806,300 | 4/1974 | Hafele et al. | 425/387 |
| 3,821,344 | 6/1974 | Peters | 264/94 |
| 3,868,773 | 3/1975 | Province | 30/130 |
| 3,869,237 | 3/1975 | Hellmer et al. | 425/292 |
| 3,910,144 | 10/1975 | Hess | 83/946 X |
| 3,971,275 | 7/1976 | Mach | 83/140 |
| 3,977,585 | 8/1976 | Sagorski | 225/101 |
| 3,989,786 | 11/1976 | Mehnert et al. | 264/98 |
| 4,037,501 | 7/1977 | Gladow | 83/100 |
| 4,060,366 | 11/1977 | Johansson | 425/290 |
| 4,122,141 | 10/1978 | Krall et al. | 264/89 |
| 4,126,658 | 11/1978 | Rupert et al. | 264/89 |
| 4,173,447 | 11/1979 | Bradbury | 425/526 |
| 4,198,886 | 4/1980 | Bowers et al. | 83/914 X |
| 4,225,303 | 9/1980 | Crisci | 425/525 |
| 4,382,469 | 5/1983 | Bell et al. | 166/248 |
| 4,390,338 | 6/1983 | Bowers et al. | 425/525 |
| 4,397,629 | 8/1983 | Akutsu et al. | 425/525 |
| 4,445,406 | 5/1984 | Thatcher | 82/46 |
| 4,463,637 | 8/1984 | Delio et al. | 83/914 X |
| 4,503,738 | 3/1985 | Morgan | 83/146 |
| 4,545,953 | 10/1985 | Cage et al. | 264/533 |
| 4,578,028 | 3/1986 | Dirksing et al. | 425/525 |
| 4,876,930 | 10/1989 | Thatcher | 82/46 |
| 4,954,071 | 9/1990 | Austin | 425/532 |
| 5,050,787 | 9/1991 | Greene | 83/914 X |
| 5,167,968 | 12/1992 | Dunlap et al. | 425/302.1 |
| 5,188,249 | 2/1993 | Cargile | 215/31 |
| 5,202,135 | 4/1993 | Yawn | 425/527 |
| 5,256,055 | 10/1993 | Morris | 425/527 |
| 5,257,560 | 11/1993 | Palazzolo | 82/46 |
| 5,346,659 | 9/1994 | Buhler et al. | 264/68 |

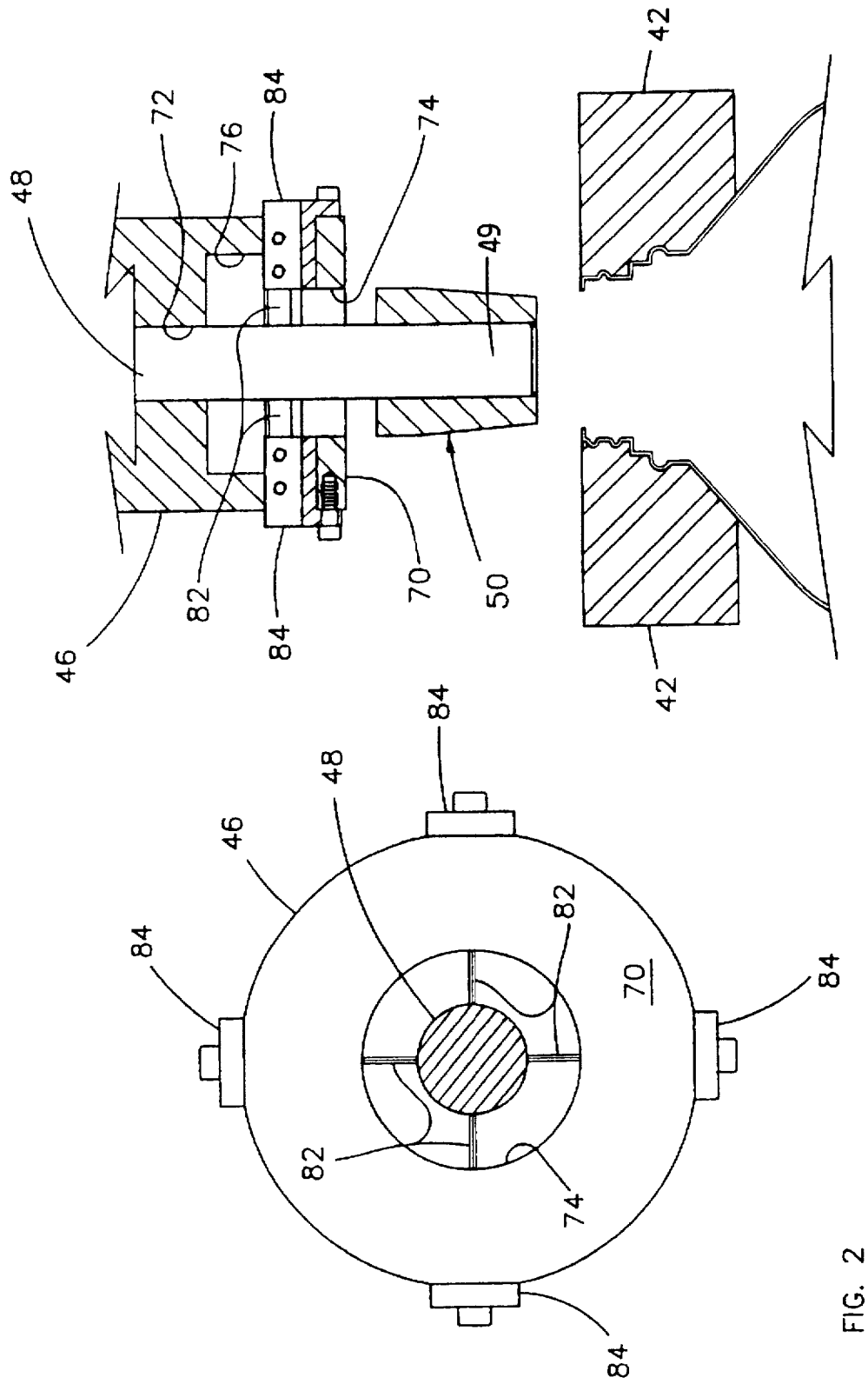

1

APPARATUS FOR TRIMMING THE NECK OF BLOW MOLDED PLASTIC BOTTLES AND METHOD

FIELD OF THE INVENTION

The invention relates to an apparatus and method for trimming a plastic ring from the neck of a blow-molded plastic bottle to provide a smooth circular sealing surface for engaging a complementary bevel ring of a linerless cap threaded onto the bottle neck.

DESCRIPTION OF THE PRIOR ART

Thin-walled plastic bottles, such as bottles filled with milk, juice, and other liquids, are blow-molded with a cylindrical neck, a spiral thread on the neck and a blow dome above the neck. The blow dome is connected to the neck by a radially inwardly extending circumferential groove.

During initial trimming of the blow-molded bottle, the blow dome is cut away from the top of the neck at the groove leaving a circumferential flange extending inwardly a short distance from the neck to an inner edge. A pair of opposed V-recesses are formed in the inner flange edge at the parison pinch lines.

Blow-molded plastic bottles of the type described are preferably closed by a linerless cap. The cap includes an interior bevel ring which extends into the opening inside the neck flange when the cap is threaded onto the neck. The bevel ring is wedged against interior edge or seal surface of the flange to form a seal closing the bottle. While a linerless cap forms a tight seal against circular portions of the inner edge of the flange, the cap does not seal the two V-recesses extending outwardly from the seal surface at the parison pinch lines.

It is possible to seal a bottle with a neck flange having V-recesses using a cap with a resilient liner in the bottom of the cap so that threading of the cap on the neck compresses the liner against the flange to form the desired seal. However, use of a lined cap undesirably increases the cost of the bottle.

The inner surface of plastic bottle neck flanges are conventionally trimmed to remove the V-recesses and form smooth circular seal surfaces permitting use of inexpensive linerless caps. Conventional bottle trimming machines remove the V-recesses by reaming the inner flange surfaces. A rotary reamer is extended into the neck flange and cuts away a circumferential portion of the interior of the neck flange including the V-recess to form a smooth circular seal surface.

Reaming of the neck flange generates plastic chips in the bottle. These chips must be completely removed from the bottle prior to filling. Removal of chips from the bottle is difficult, and, in the case of a bottle with a handle, nearly impossible.

In addition to providing a smooth seal surface on the neck flange by reaming, it is also conventional to blow-mold plastic bottles using a special mold which includes a cylindrical tool positioned below the neck portion of the mold during molding. The tool is withdrawn outwardly of the neck immediately after blow-molding of the bottle to form a smooth cylindrical surface on the interior of the neck suitable for sealing using a linerless cap. Blow-molding bottles using this method requires specialized and expensive tooling for each mold. This method is not well adapted for use on high speed multi-mold rotary blow-molding machines of the type conventionally used for blow-molding thin-walled plastic bottles advantageously closed by linerless caps.

SUMMARY OF THE INVENTION

The neck trimming apparatus according to the invention extends a reverse punch through the flange at the top of a neck in a blow-molded bottle to position the punch in an extended position in the bottle, below the flange. The trailing end of the punch has a diameter greater than the diameter of the inner edge of the flange and elastically bends the flange away from the punch during extension. After the punch has been moved past the flange, the shoulder snaps back to its original position and overlies the trailing end of the punch. The punch is then withdrawn. The outer portions of the flange is held on a circular anvil so that the punch cuts a narrow ring of plastic from the inside of the flange. The cut-away ring includes the V-recesses. Withdrawal of the punch moves the cut ring out of the bottle without leaving any plastic chips or debris in the bottle. The narrow ring has a width greater than the depth of the V-recesses formed in the flange during molding to assure that the cut surface on the interior of the flange is smooth and suitable for cooperating with the linerless cap to form a tight seal closing the bottle.

The lead end of the punch has a diameter less than the diameter of the opening in the flange to facilitate piloting of the punch into the opening. The trailing end of the punch is larger than the opening and includes a circular cutting edge and top facing away from the bottle. The edge cooperates with the anvil to cut the narrow ring from the flange upon retraction of the punch.

The punch is mounted on the forward end of a shaft with the rear end of the shaft connected to a drive for extending and retracting the punch. Rings severed from bottles are captured on the shaft, and are cut into circumferential sections which are conveyed from the machine to a scrap receptacle. The punch forces the rings against a number of fixed cutting blades which sever the rings into segments for discharge.

The reverse punch trimmer rapidly and accurately forms a smooth seal surface on the inside of the flange at the top of a blow-molded plastic bottle for forming a tight seal with an inexpensive linerless cap. During reverse punching, the neck of the bottle is held in a neck clamp. The clamp assures that the punch trims the neck flange coaxially with the neck. As a result, a linerless cap threaded upon the neck is positioned coaxially with the trimmed surface and the bevel ring on the cap forms a tight seal against the trimmed seal surface.

Other objects and features of the invention will become apparent as the description proceeds, especially when taken in conjunction with the accompanying drawings illustrating the invention, of which there are 5 sheets and one embodiment.

DESCRIPTION OF THE DRAWINGS

FIG. 2 is an enlarged sectional view taken along line 2—2 of FIG. 1;

FIGS. 3, 4, and 5 are sectional views taken along line 3—3 of FIG. 1 showing the operation of the trimmer;

3

Figure 10:
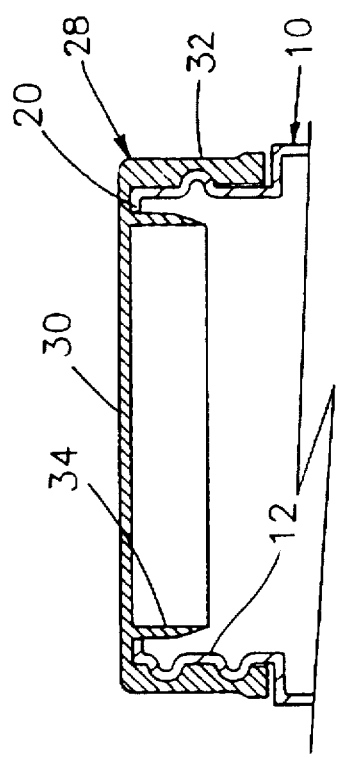
Figure 7:
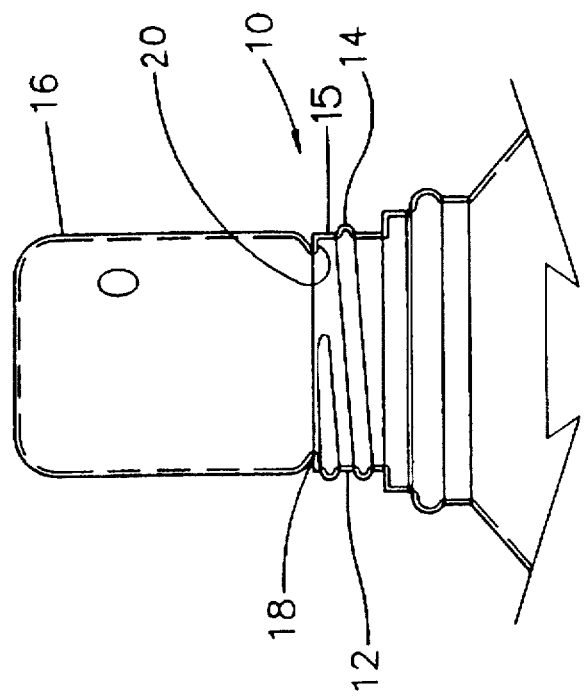
FIG. 7 is a side view of the top of a blow-molded bottle with attached blow dome.
Figure 6:
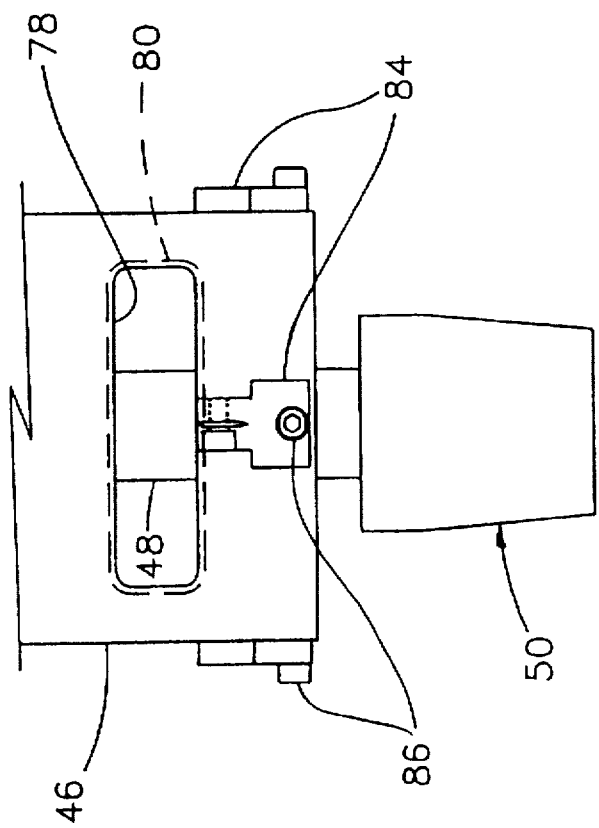
FIG. 6 is a side view taken along line 6—6 of FIG. 1.
Figure 8:
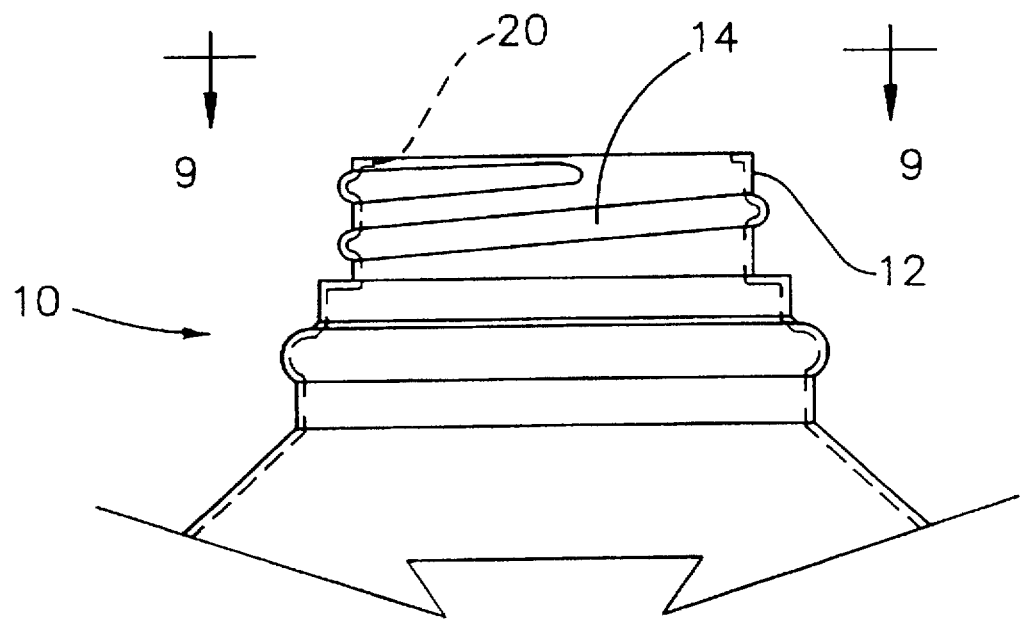
FIG. 8 is a view similar to FIG. 7 after trimming away the blow dome.
Figure 9:
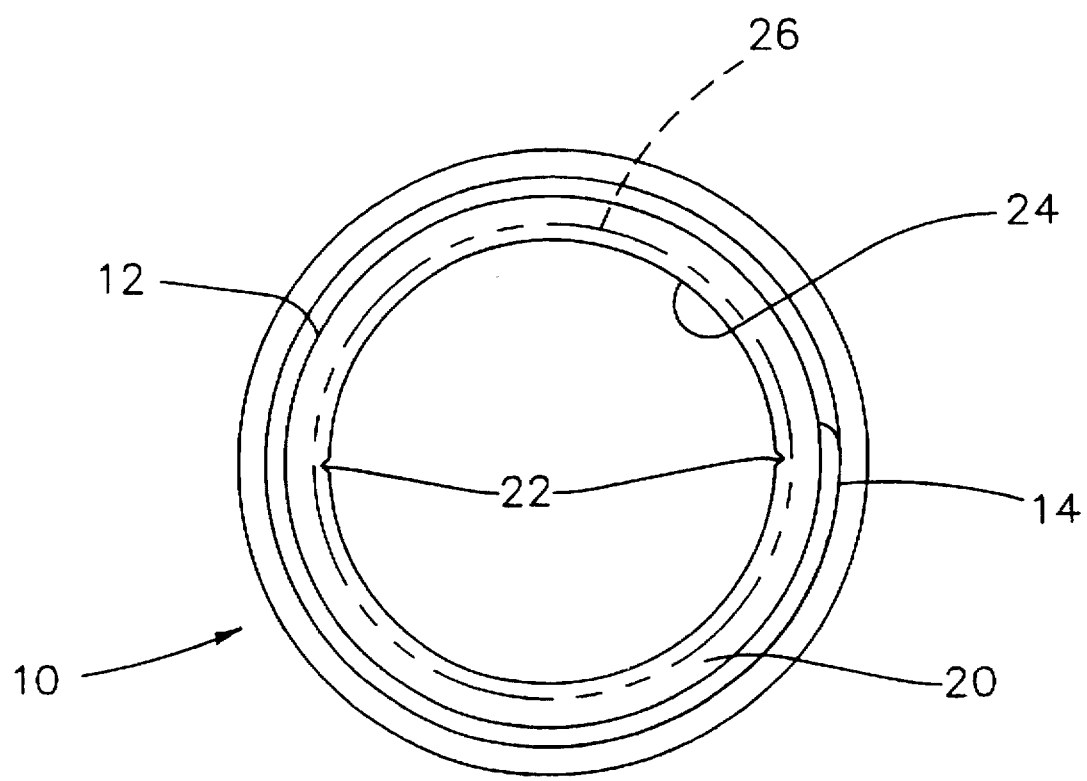
FIG. 9 is a top view taken along line 9—9 of FIG. 8.

FIG. 10 is a sectional view similar to FIG. 8 with a linerless cap threaded on the bottle neck.

DESCRIPTION OF THE PREFERRED EMBODIMENTS

FIGS. 1 through 6 of the drawings illustrate a bottle neck trimming apparatus 40 for trimming a thin ring from the interior circumference of a flange 20 located at the top of plastic bottle 10 shown in FIGS. 7–10. The bottle 10 is preferably formed by blow-molding and has relatively thin walls approximately 0.025 inches thick. FIGS. 7–10 illustrate the top of the bottle 10 including a cylindrical neck 12 having an exterior thread 14 wrapped around the radial outer part 15 of the neck. When ejected from the blow-molding machine, bottle 10 includes a blow dome 16 which is joined to the top of the neck at a circular groove 18 extending around the neck 12. During initial trimming of the bottle 10, the blow dome 16 is severed from the neck 12 at the bottom of groove 18 so that the bottom of the groove forms a circumferential flange 20 extending inwardly from the top of neck 12. A pair of 180 degree-opposed V-recesses 22 are formed on the inner edge 24 of flange 20. The V-recesses are the consequence of blow-molding a bottle having a neck with a diameter less than the diameter of the parison from which the bottle is blow-molded. The neck trimming apparatus 40 disclosed herein trims away narrow rings of plastic from the inner edge of flange 20 along circular trim line 26 located radially outwardly of the V-recess to form a new completely circular inner edge on the flange suitable for forming a tight seal with linerless cap 28 as shown in FIG. 10.

Linerless cap 28 includes a circular top 30, a cylindrical side 32 joined to the top, an interior thread recess engagable with bottle thread 14 and a circular ring 34 having an outwardly facing bevel surface engaging the inner edge of bottle flange 20 to form a tight seal between the bottle and cap. The cap is threaded on neck 12 of a trimmed bottle 10 as shown in FIG. 10. Bevel ring 34 tightly seals against the trimmed inner edge of flange 20.

Referring now to FIGS. 1–6, trimming apparatus 40 includes a neck clamp having a pair of neck clamp jaws 42 and a suitable drive, not illustrated, operable to open and close the neck clamp so that the neck 12 of bottle 10 is confined in a neck recess between the jaws with the top of the jaws flush with the top of the bottle neck 12 and flange 20. See FIG. 1.

Trimming apparatus 40 also includes a punch assembly 44 comprising a body 46, a punch shaft or punch support member 48 extending vertically through the body and having forward end 49 and rear end 51, a reverse punch 50 mounted on the forward end of shaft 48, and a punch drive cylinder 52 mounted on the top of body 46 by suitable spacers 54. Cylinder 52 is preferably operated by compressed air. The rear end 51 of shaft 48 is joined to rod 56 of cylinder 52 by a suitable connection.

The upper end of cylinder 52 is secured to support plate 58, which may be the upper platen of a bottle deflashing machine. Vertical movement of plate 58 moves assembly 44 toward and away from neck clamp jaws 42. Extension and retraction of cylinder 52 extends and retracts reverse punch 50 relative to the jaws.

The reverse punch 50 is symmetrical around the longitudinal axis of the shaft 48 and includes a flat circular trailing end 60, a cylindrical upper portion 62 joining trailing end 60 at a sharp circular cutting edge 64, an inwardly tapered or frustoconical lower portion forming a flange bend surface 66

4 and a leading end 68. The leading end faces jaws 42. The trailing end 60 and edge 54 face away from the jaws.

The diameter of leading end 68 is less than the interior diameter of bottle flange 20 as molded, in order to facilitate free piloting of the leading end of the punch into the neck opening defined by the inner flange edge 24 after severing of the blow dome.

The diameter of the upper portion 62 and cutting edge 64 is greater than the diameter of the leading end and is also greater than the diameter of flange inner edge 24.

Figure 5:
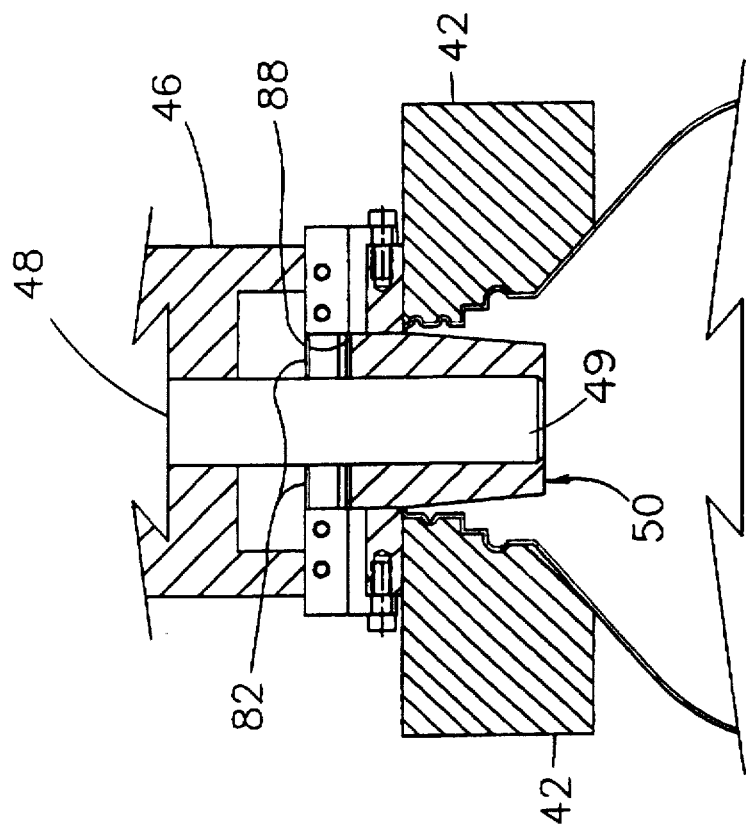

Punch assembly body 46 includes a flat lower anvil face 70 located above and parallel to the top surfaces of clamp jaws 42. The punch shaft 48 is slidably fitted in bore 72 extending through the upper portion of body 46, as shown in FIG. 3. Anvil bore 74 extends inwardly from face 70. The diameter of the anvil bore is slightly greater than the diameter of the upper portion 62 and cutting edge 64 of punch 50 to permit retraction of the punch into the bore as shown in FIG. 5. The upper end of the anvil bore opens into an enlarged chip chamber 76 which extends laterally to two discharge ports 78 located on opposite sides of body 46. Vacuum discharge manifolds 80, shown in FIGS. 1 and 6, surround ports 78 and are connected to a vacuum source 81 to assure a flow of air up through the anvil bore 74, chamber 76, through the ports 78 and then along the manifolds 80 to the vacuum source when the punch 50 is out of the anvil bore.

Four 90-degree ring cutting spaced blades 82 are mounted on the lower end of body 46 and extend into the upper end of anvil bore 74 as shown in FIGS. 2 and 3. The blades present sharp cutting edges facing the trailing end of reverse punch 50. Each blade is mounted on a removable carrier 84, shown best in FIGS. 3–6. The carriers are secured to the lower end of body 46 by screws 86 to facilitate blade replacement as required.

The operation of neck trimming apparatus 40 will now be described.

Figure 1:
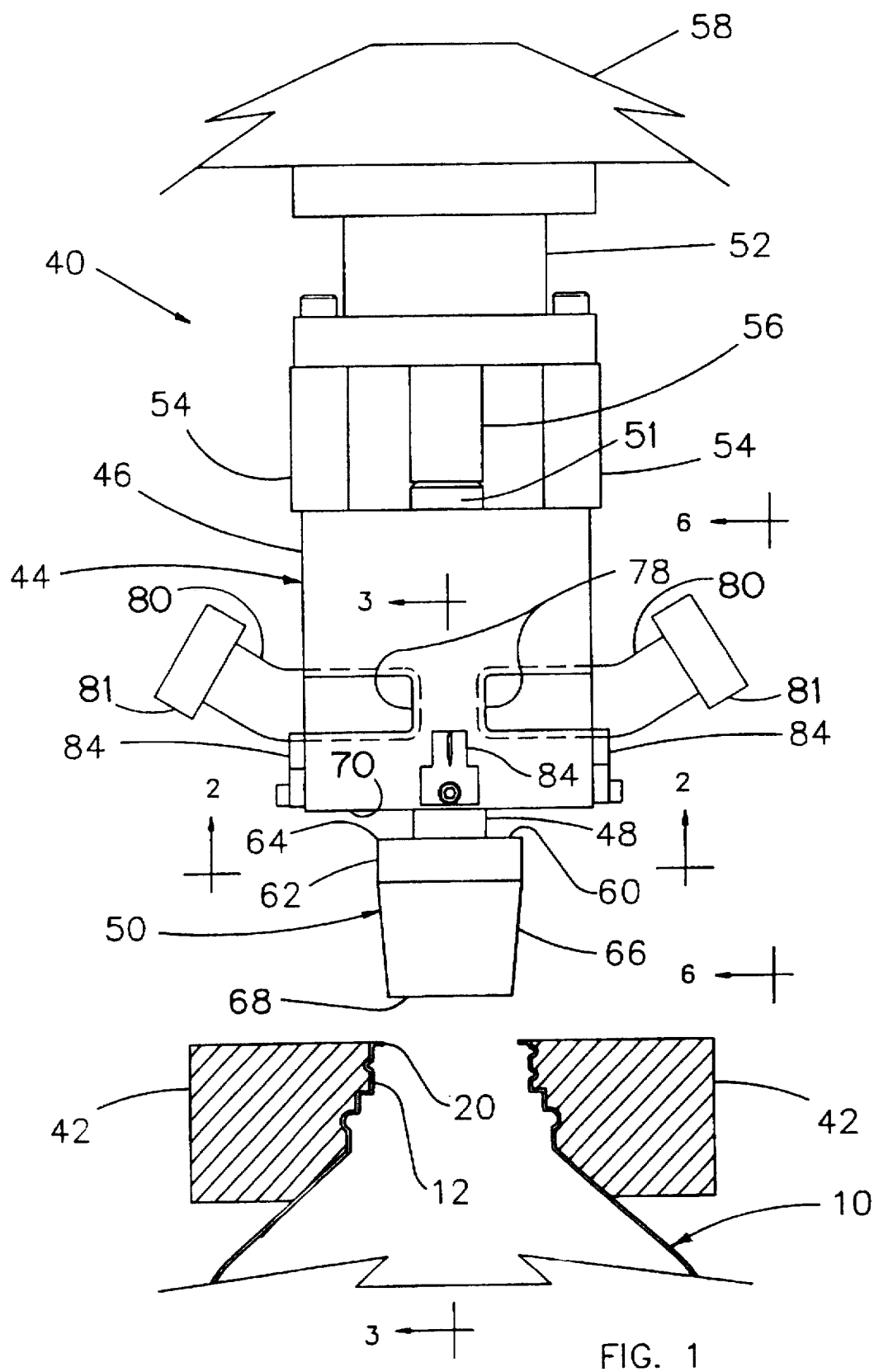
FIG. 1 is a side view, partially broken away, of the invention.

Following trimming away of the blow dome of bottle 10, as previously described, the bottle 10 is positioned between open neck clamp jaws 42 which are then closed to secure the bottle in place. At this time, cylinder 52 is extended to position reverse punch 50 below the anvil face 70 of body 46. Support plate 58 is in the up position to locate the leading end of the punch a distance above the top of the clamp jaws. The punch is above the opening at the top of bottle neck 12 and in axial alignment with the bottle neck. This position is shown in FIGS. 1 and 3.

Figure 4:
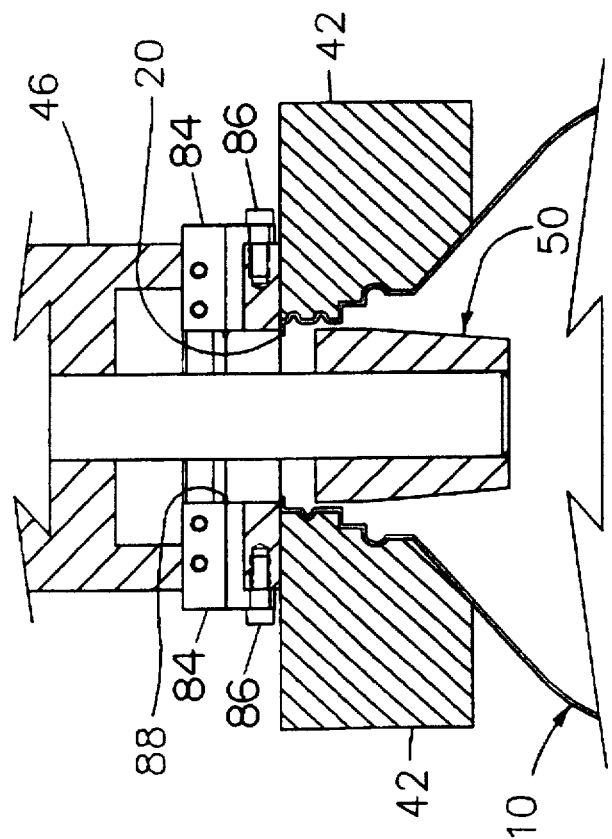

Plate 58 is then lowered to lower assembly 44 and seat the anvil face 70 of body 46 against the top of the clamp jaws 42 as shown in FIG. 4. Downward movement of the punch assembly first extends the leading end 68 of the reverse punch 50 freely into the opening at the top of the bottle neck defined by inner flange edge 24. Continued downward movement of the reverse punch brings the frustoconical surface of lower portion 66 into engagement with flange edge 24. Portion 66 elastically bends the flange 20 downwardly to enlarge the interior opening and permit complete passage of the punch 50 through the flange. The flange is formed from a plastic wall having a thickness of approximately 0.025 inches, permitting elastic deformation during insertion of the punch into the bottle. After the punch is fully inserted, the plastic snaps back and returns to its former radial inward shape with the inner edge 24 positioned above the cutting edge 64 on the trailing end of the reverse punch. The top of the flange located radially outwardly of trim line 26 rests flush on body anvil face 70. See FIG. 4.

Following insertion of the reverse punch through the flange 20 and into the bottle, as shown in FIG. 4, cylinder 52 is retracted to withdraw the reverse punch from the position of FIG. 4 to the position of FIG. 5. Upward withdraw movement of the reverse punch moves the trailing end of the punch and cutting edge up against the innermost portion of flange 20 to shear a thin circular ring 88 from the inside of the flange along trim line 26. The flange outwardly of the trim line is held against upward movement by anvil face 70. The trim line 26 is located radially outwardly of the two V-recesses 22, thereby assuring that the newly trimmed inner edge of flange 20 is cylindrical and smooth and will form a tight seal with the bevel ring 34 of linerless cap 28.

After severing of ring 88 from the inner edge of flange 20, continued retraction of the reverse punch 50 into bore 74 moves the ring up and into engagement with the cutting edges of the blades 82. Full retraction of cylinder 52 positions the trailing end 60 of the reverse punch a few thousands of an inch below the cutting edges of the blades so that the ring 88 is impaled on the blades and partially severed by each blade. Retraction of the reverse punch is stopped below the blades to assure that the punch does not contact and injure the blades.

After full retraction of the reverse punch, the cycle of operation of the neck trim apparatus is completed by returning plate 58 to the uppermost position, extending cylinder 52 to re-extend the reverse punch of the position of FIG. 1 and opening of the neck clamp jaws to release the trimmed bottle 10.

During trimming of the next bottle presented to apparatus 40, the reverse punch will sever and move a second ring 88 up against and into engagement with the four blades 82. The upward movement of the second ring will force the first ring further up against the blades to sever the first ring into four relatively small segments. The second ring will then be impaled on the blades, but not severed by the blades. When the reverse punch is extended outwardly of the anvil bore 72, the vacuum source will draw air up through the bore 72, chamber 76, port 78, and manifolds 80 to entrain the small ring segments and carry them away from the trim apparatus to a scrap container.

The disclosed trimming apparatus extends and retracts the reverse punch using a punch drive including cylinder 52 and the movable plate 58. If desired, the reverse punch may be extended into bottle 10 and retracted from the bottle, cutting away a ring 88, by a single drive element, which may be a fluid-driven cylinder. A suitable anvil may be provided to hold the top of the flange against movement during retraction of the punch and cutting away of the plastic ring.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. An apparatus for trimming an inner edge of a flange extending radially inwardly from the top of the neck of a plastic bottle, the apparatus comprising a bottle neck clamp, a punch shaft having a forward end and a rear end, a reverse punch mounted on the forward end of the punch shaft adjacent to the neck clamp, the reverse punch having a leading end adjacent the neck clamp, a trailing end remote from the neck clamp, a flange bend surface and a circumferential cutting edge adjacent the trailing end; a punch drive connected to the punch shaft so that extension of the drive moves the bend surface into engagement with the flange to bend the flange inwardly and permit the reverse punch to move into the bottle, and retraction of the drive moves the cutting edge into engagement with and past the flange to cut a plastic ring surrounding the punch shaft from the flange.

2. An apparatus as in claim 1 wherein the leading end of the reverse punch is smaller than the trailing end of the reverse punch.

3. An apparatus as in claim 2 wherein the bend surface is frusto-conical in shape and the cutting edge is circular.

4. An apparatus as in claim 3 including a circular anvil overlying the bottle flange.

5. An apparatus as in claim 1 including an anvil and an anvil bore in the anvil, said cutting edge of the reverse punch sized smaller than the anvil bore.

6. An apparatus as in claim 5 wherein said anvil bore and cutting edge are circular; and the leading end of the reverse punch is smaller than the trailing end.

7. An apparatus as in claim 1 wherein the punch drive includes a fluid cylinder joined to the rear end of the punch shaft.

8. An apparatus as in claim 7 including an anvil drive connected to the anvil for moving the anvil toward and away from the neck clamp.

9. An apparatus as in claim 8 including a connection between the anvil and punch drives wherein said anvil drive moves the fluid cylinder toward and away from the neck clamp.

10. An apparatus as in claim 1 including a ring cutting blade having a cutting edge, said blade cutting edge located adjacent the circumferential cutting edge when the punch drive is retracted.

11. An apparatus as in claim 10 including a plurality of ring cutting blades spaced around the circumferential edge when the punch drive is retracted.

12. An apparatus as in claim 10 including a body, said punch shaft extending through said body, an anvil on said body surrounding the punch shaft and located adjacent the neck clamp, a chamber in the body surrounding the punch shaft, an anvil bore in the body surrounding the punch shaft and extending between the anvil and the chamber, and a discharge port.

13. An apparatus as in claim 12 including a discharge manifold having an inlet end adjacent said discharges port.

14. An apparatus as in claim 13 including a vacuum source connected to said discharge manifold.

15. An apparatus as in claim 1 including a for ring severing element.

16. An apparatus as in claim 15 wherein said ring serving element includes a ring cutter.

17. An apparatus as in claim 16 wherein said ring cutter comprises a blade.

18. An apparatus as in claim 17 wherein said blade extends outwardly from said punch shaft.

19. An apparatus for trimming a ring from an inner edge of a flange extending radially inwardly on the neck of a molded plastic bottle, the apparatus including a punch support member, a drive joined to the punch support member, and a reverse punch joined to an end of the punch support member, the reverse punch having a leading end, a trailing end larger than the leading end, a flange bend surface and a circumferential cutting edge extending around the trailing end.

20. An apparatus as in claim 19 wherein the circumferential cutting edge is circular.

21. An apparatus as in claim 20 wherein the leading end of the reverse punch is circular.

22. An apparatus as in claim 21 wherein the flange bend surface extends around the reverse punch and is tapered.

23. An apparatus as in claim 19 wherein the punch support member comprises a punch shaft.

24. An apparatus for trimming the neck of a blow molded plastic bottle by removing a ring of plastic to provide a smooth, circular sealing surface for engaging a complementary surface on a closure, the apparatus including, clamp jaws defining a neck recess, said clamp jaws holding the neck of a blow molded plastic bottle in the recess; a punch assembly on one side of the clamp jaws, the assembly comprising a body, an anvil face on the body overlying the clamp jaws, a punch support member extending into the body and movable relative to the body, said punch support member having a first end adjacent the anvil face, a circular anvil bore in the anvil face surrounding the end of an support member and a reverse punch on an end of the support member, said reverse punch having a trailing end adjacent to the, a circular cutting edge adjacent the trailing end, a leading end smaller than the trailing end and a flange bend surface between the leading and trailing ends, said cutting edge fitting in said anvil bore; and a drive joined to the support member for moving the punch support member between a first extended position in which the reverse punch is located in the recess between the clamp jaws and a retracted position in which the cutting edge is located in the anvil bore.

25. An apparatus as in claim 24 including a ring cutter in the anvil bore.

26. An apparatus as in claim 25 wherein the ring cutter comprises a cutting blade.

27. An apparatus as in claim 24 wherein said flange bend surface extends around the reverse punch.

28. An apparatus as in claim 24 including a chamber in said body extending from the anvil bore to an opening on a surface of the body.

29. An apparatus as in claim 28 including a manifold surrounding said opening and extending away from the body.

30. An apparatus as in claim 29 including a vacuum source connected to the manifold.

31. An apparatus as in claim 24 wherein said punch support member comprises a punch shaft.

* * * * *

UNITED STATES PATENT AND TRADEMARK OFFICE
CERTIFICATE OF CORRECTION

PATENT NO. : 5,749,275
DATED : May 12, 1998
INVENTOR(S) : Dennis L. Dundas

It is certified that error appears in the above-indentified patent and that said Letters Patent is hereby corrected as shown below:

Claim 1, line 3, delete "clamp" and substitute --clamp;-- therefor.
Claim 13, line 2, change "discharges" to --discharge--.
Claim 15, line 1, delete "for".
Claim 16, line 1, change "serving" to --severing--.
Claim 24, line 4, delete "including," and substitute --including-- therefor; line 12, delete "an" and substitute --the punch-- therefor; line 15, following the first occurrence of "the" insert --body--.

Signed and Sealed this

Fourth Day of August, 1998

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,749,275
DATED : May 12, 1998
INVENTOR(S) : Dennis L. Dundas

It is certified that error appears in the above-identified patent and that said Letters Patent is hereby corrected as shown below:

In the Claims:
    Claim 1, line 3, delete "clamp" and substitute --clamp;-- therefor.
    Claim 13, line 2, change "discharges" to --discharge--.
    Claim 15, line 1, delete "for".
    Claim 16, line 1, change "serving" to --severing--.
    Claim 24, line 4, delete "including," and substitute --including-- therefor; line 12, after "surrounding", delete "the" and substitute --an-- therefor; line 12, following "end of" delete "an" and substitute --the punch-- therefor; line 13, after "the" insert --punch--; line 15, following the first occurrence of "the" insert --body--.

This certificate supersedes Certificate of Correction issued August 4, 1998.

Signed and Sealed this

First Day of December, 1998

BRUCE LEHMAN

*Attest:*

*Attesting Officer*  *Commissioner of Patents and Trademarks*